United States Patent [19]

Peter et al.

[11] Patent Number: 4,592,320

[45] Date of Patent: Jun. 3, 1986

[54] METHOD OF AND DEVICE FOR ADAPTIVE FEEDING FORWARD A DISTURBANCE VARIABLE IN A REGULATOR

[75] Inventors: Cornelius Peter; Claus Ruppmann, both of Stuttgart, Fed. Rep. of Germany

[73] Assignee: Robert Bosch GmbH, Stuttgart, Fed. Rep. of Germany

[21] Appl. No.: 727,901

[22] Filed: Apr. 26, 1985

[30] Foreign Application Priority Data

Jun. 30, 1984 [DE] Fed. Rep. of Germany ....... 3424197
Nov. 2, 1984 [DE] Fed. Rep. of Germany ....... 3439927

[51] Int. Cl.$^4$ ............................................. F02D 11/10
[52] U.S. Cl. ..................................... 123/339; 123/352
[58] Field of Search ............... 123/339, 350, 352, 351, 123/361, 585

[56] References Cited

U.S. PATENT DOCUMENTS

| 4,425,888 | 1/1984 | Engel et al. | 123/352 X |
| 4,428,341 | 1/1984 | Hassler et al. | 123/350 |
| 4,441,471 | 4/1984 | Kratt et al. | 123/339 |
| 4,478,183 | 10/1984 | Misch et al. | 123/339 |
| 4,513,711 | 4/1985 | Braun et al. | 123/339 |
| 4,513,712 | 4/1985 | Gässler et al. | 123/339 |

Primary Examiner—W. R. Wolfe
Attorney, Agent, or Firm—Michael J. Striker

[57] ABSTRACT

A method and a device for an adaptive forward feeding of a disturbance correcting signal in a regulator is based on storing an output signal from the regulator at a first time point $t_0$ corresponding to the occurrence of a disturbance. At a later time point $t_1$ when the disturbance has been settled by the regulator, a second output signal from the regulator indicative of the final integration level is compared with a stored signal and the difference signal is processed and combined with a constant disturbance correcting signal, thus producing another an adapted disturbance correcting signal which minimizes the deviation from a desired magnitude and at the input of the regulator. The processing of the adaptive correction signal at the output of the comparator is preferably made by an integration according to a preset formula of a plurality of differences produced from a plurality of forward switching actions before the second time point $t_1$. The averaged adaptive correction signal is then applied at the time point $t_1$ to a summing device where it is added to the constant disturbance correcting signal.

12 Claims, 2 Drawing Figures

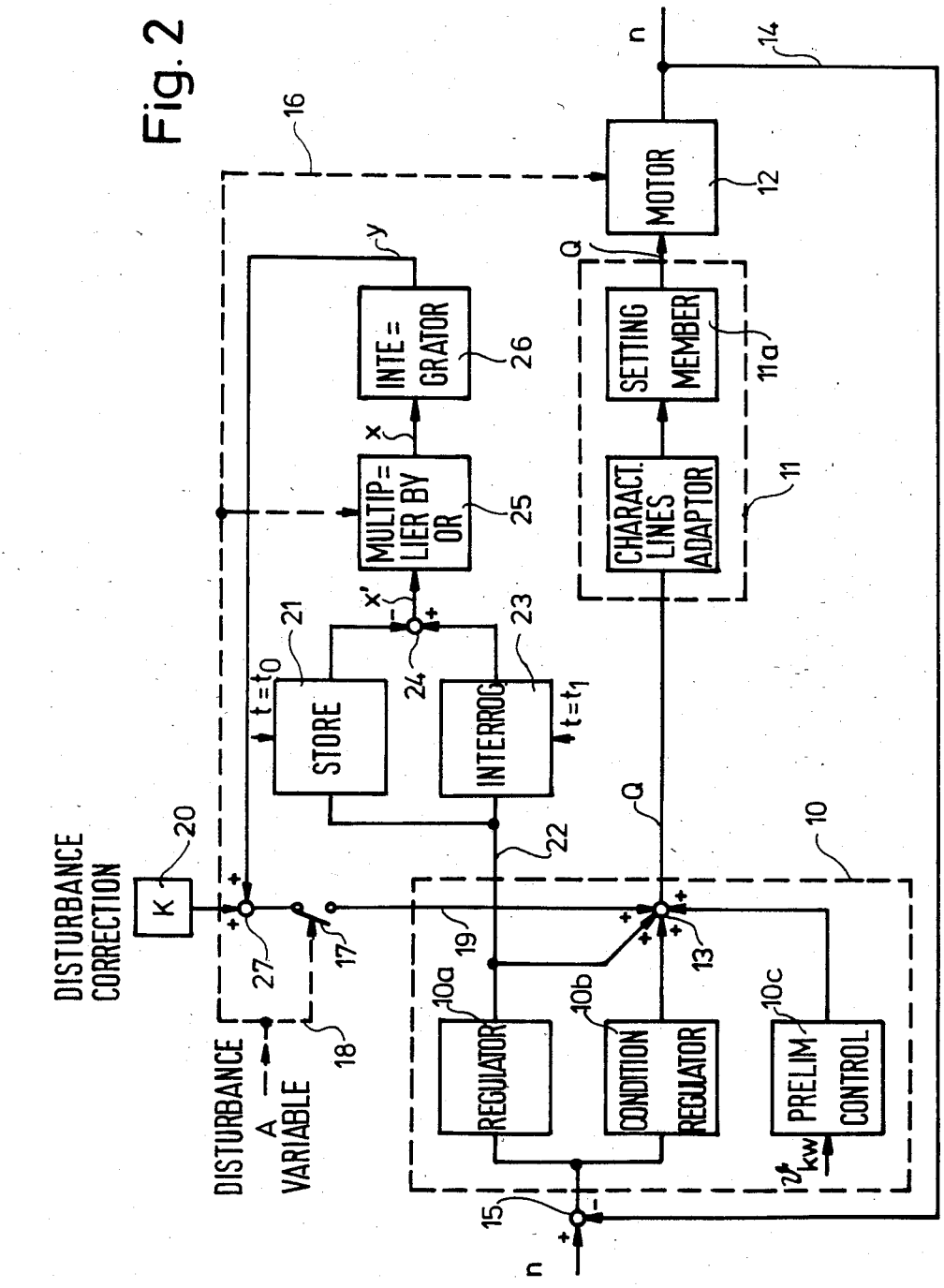

METHOD OF AND DEVICE FOR ADAPTIVE FEEDING FORWARD A DISTURBANCE VARIABLE IN A REGULATOR

BACKGROUND OF THE INVENTION

The present invention relates to a method of and a device for self-adapting feeding forward a disturbance variable in a regulating system, particularly in an air charge regulator for idling speed of an internal combustion engine.

In many applications of regulation technology it is conventional to determine certain variables such as values or positions by a regulating or controlling method in which regulating variables, usually electrical signals having a predetermined functional course, are supplied by a regulator which processes certain input signals fed back from a regulating path so as to include in its regulating behavior the results of regulation on the adjustment of a final setting member. The regulator possesses certain operational characteristics which depending on the application are usually designated as a P-behavior (proportional regulator) or I-behavior (integral regulator) or as a D-behavior (regulator with delay).

In many cases the reaction of the regulators is frequently cumbersome or slow, particularly when in the range of the regulating path, disturbing variables are received. As a consequence, at least undesired oscillations of the regulated actual value will result and these disturbances are also enhanced by the dead time of the regulating system.

In order to achieve that the regulator acts as fast as possible on disturbance, it has been known to provide a so-called feeding forward or disturbance value switching-in measure by means of which a constant or preset disturbance signal is applied immediately in response to the occurrence of a disturbance variable and not in response to the change of the actual value of the regulated magnitude which produces a counter-acting signal at the output of the regulator. In a known circuit for feeding forward a disturbance variable, depending on the output of an evaluation stage "disturbance value yes/no", immediately a change of the output signal from the regulator is produced before the regulator can detect the effect of the disturbance variable on the actual value of the regulated magnitude.

A problem encountered in this known disturbance variable forward feeding circuit is the fact that the value of the disturbance may undergo a change in the course of time. This change even if anticipated and known within certain limits, cannot be taken into account and the regulator does not react thereon.

Therefore a need was felt to provide a regulating method or a device for an adaptive forward feeding of a disturbance variable in a regulator which would be capable of an automatic correction of the changes in the disturbance variables caused by external conditions, for example.

The following considerations relate specifically to situations in a so-called idling speed air charge regulators in internal combustion engines, for which the present invention is particularly suitable. It will be understood however that this invention is not limited to idling speed air charge regulation but is applicable also for any regulating process in which it is desirable to provide a rapid reaction to the occurrence of a disturbance and accordingly in which the before mentioned forward feeding of a disturbance signal is applicable.

In an idling speed air charge regulation as known, the disturbances occur for example during the switching-on of an air conditioner or after an automatic transmission shifts from a neutral position in a driving stage. In both instances considerable loads with corresponding rotary speed changes are produced. These sudden loads must be quickly intercepted especially in the idling speed range operating at the relatively low rotary speed. Furthermore, it must be taken into account that such disturbance variables may cause strongly fluctuating loads, for example in the case of an air conditioner the load changes in response to momentary external temperatures or to the setting of an internal thermostat.

SUMMARY OF THE INVENTION

It is therefore a general object of the present invention to overcome the aforementioned disadvantages. In particular, it is an object of this invention to provide an improved forward feeding of a disturbance variable in a regulator which adjusts itself to different loads caused by the disturbance or in other words which is self-adaptive. By virtue of this capability to learn, substantially better composition of the disturbance variable at the moment the build up of the load. Another object of this invention is to provide such an improved disturbance forward feeding which even in the case when only a yes/no signal is known about the occurrence of a disturbance, the feeding-in of a disturbance variable does not operate with a constant but with a value which has been derived from the reaction of the regulator to a preceding disturbance within a known range.

In keeping with these objects and others which will become apparent hereafter, one feature of the invention resides, in a method of feeding forward a disturbance variable in a regulator, in the steps of storing in a memory an output signal from the regulator occurring at a time point $t_0$ of feeding the disturbance variable in the regulator, settling the disturbance variable by the regulator, comparing the actual output signal from the regulator at a later time point $t_1$ when the disturbance variable is settled, with the stored signal to establish a difference signal x, deriving from the difference signal an additional disturbance correctional signal y, and combining the additional correction signal y with the a constant disturbance correcting signal K to achieve self-adapting matching of the constant disturbance correcting signal with the changes of the disturbance variable.

In the preferred embodiment of this invention, the matching of the self-adjustment of the constant disturbance correcting signal is divided among a plurality of forward feeding processes so that the possibility of a matching error which might occur during a single switching process only, is eliminated. As a matter of fact, in a single switching-in process there may also take effect other disturbance variables which are not fed in the regulator and consequently the self adaption may become adulterated. By means of the averaging a plurality of distributed feeding forward or switching-in processes it is granted that the adaption of the constant disturbance correcting signal follows exactly the disturbance variable which is intended to be compensated for.

It is also of advantage when, in order to optimize the automatic matching of the forward feeding of the disturbance variable, the adaption is made possible also in the case when no sensor for detecting the actual speed of the motor vehicle is provided and no speed signal is available. An adaptive forward feeding of a disturbance variable is still made possible provided that at a close throttling valve switch the rotary speed is maintained for a predetermined time period within a predetermined range of the idling speed and simultaneously (AND operation) the control signal for an idling speed setting member for a predetermined time period has not exceeded predetermined limit values of change. The latter signal in the range of an idling speed air charge regulation is available and therefore can be employed for the simultaneous release of the self-adaptive forward feeding.

The novel features which are considered as characteristic for the invention are set forth in particular in the appended claims. The invention itself however both as to its construction and its method of operation, together with additional objects and advantages thereof will be best understood from the following description of specific embodiments when read in connection with the accompanying drawing.

BRIEF DESCRIPTION OF THE DRAWING

FIG. 2 is a block circuit diagram of an embodiment of the regulator of FIG. 1 including the adaptive forward feeding of a disturbance variable according to this invention.

DESCRIPTION OF THE PREFERRED EMBODIMENTS

Figure 1:
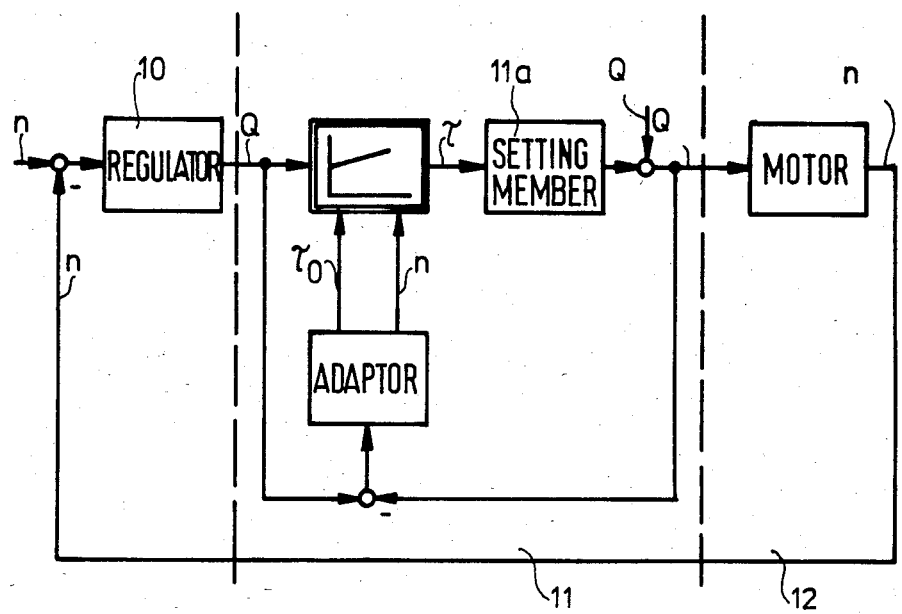
FIG. 1 is a block circuit diagram of an idling speed-air charge regulation including a regulator, an interconnected characteristic line adapter and a regulating feedback from a motor.

This invention is based on the concept of adapting the forward feeding unit for a disturbance variable, to the reaction of the regulator to the disturbance so that in the final effect and in an ideal case the forward feeding of an adapted disturbance eliminates the need for the regulator to react. In other words, the forward feeding of the adaptive disturbance variable minimizes a deviation of an actual magnitude to be regulated from a desired value to such an extent that the deviation is practically non-detectable by the regulator.

With regards to the following description of the preferred embodiment of this invention it will be noted that the examples which are illustrated in the form of discrete circuit blocks serve merely for describing the basic operation of this invention and its specific functions but the actual realization of the device of this invention may greatly differ from the given example. In particular, the individual circuit blocks can be realized by an analog, digital or also by a hybrid technology. In another actual embodiment, the functional blocks can be integrated into a program-controlled digital system, for example in the form of microprocessors, microcomputers or other digital or analog logic circuits. The following description of the functional block diagrams of the embodiment of this invention therefore represents the overall functioning and time relations of the effects of respective blocks and the cooperation of partial functions represented by such blocks. The following description relates specifically to the application of this invention for improving an idling speed air charge regulation (LFR) of an internal combustion engine. In this kind of regulation, a setting variable delivered by an idling speed regulator influences the actual rotary speed of the motor. If desired, the setting variable from the idling speed regulator passes through an intermediate adaptive circuit for characteristic lines of a setting member which internally compares the setting variable in the form of a desired air charge $Q_{soll}$ with the actual air charge $Q_{ist}$. This invention is fitted to the idling speed regulator 10. The adapter block 11a serves for adaption of characteristics of a setting member 11a and the regulating feedback path is indicated by reference numeral 12. In this embodiment the idling speed air charge setting member 11a affects the cross-section of opening in the intake manifold of the engine, particularly by increasing or reducing the clearance of a bypass conduit or in motor vehicle by adjusting the air throttle valve.

Referring to the more detailed functional block circuit diagram of FIG. 2, the regulator 10 includes an integral regulator 10a, a condition regulator 10b and a preliminary control block 10c. The output signals of the blocks 10a through 10c are applied to a summer 13. The inputs of integral regulator 10a and of condition regulator 10b are connected in parallel to the output of a subtractor 15 which delivers a regulating deviation resulting from the comparison of the desired rotary speed $n_{soll}$ with the actual rotary speed $n_{ist}$, the latter signal being delivered to the subtractor 15 via a feedback conduit 14 from the output of the engine 12.

In order to provide a forward feeding of a disturbance variable according to this invention, the following measures are taken: a disturbance variable A whose limits are always known in advance, occurs at a certain time point and affects the engine 12 and its regulating feedback path 14. At the same time the disturbance variable A closes a switch 17 as indicated by dashed line 18. In an actual idling speed air charge regulator the switch 17 is closed simultaneously with turning on an air conditioner so that a constant disturbance correcting signal K from the stack 20 is immediately applied to the summer 13 to influence the compound output signal $Q_{soll}$ from the regulating circuit 10. Of course, the turning-on of an air conditioner, as mentioned before, affects simultaneously the regulating feedback path due to the reduced rotary speed at the output of the engine caused by an increased load of the latter.

In accordance with this invention, there is provided a data storing device connected to an output of the regulator 10 and being activated in response to the occurrence of the disturbance variable A in such a manner as to store an output signal from the regulator at this time point $t_0$. In the given example, a branch conduit 22 from the output of the integral regulator 10a applies a signal corresponding to the level of integration in the regulator 10a for storing in the device 21. At a later time point $t_1$ when the effects of disturbance variable A have been compensated for by the regulating circuit, the actual level of integration at the output of the integral regulator 10a is read by an interrogation block 23 and simultaneously at the time point $t_1$ the stored integration level is read out from the device 21 and applied together with the momentary integration level signal to a comparator or subtractor 24. The comparison is effected by subtracting the stored integration level signal from the actual integration level signal and the resulting difference signal x at the output of subtractor 24 can be either positive or negative depending on the magnitude of the priming disturbance correction signal. In the event that the disturbance correction signal from the block 20 was too small, then the difference signal x is positive because in this case the integrating regulator 10a must have pulled in step and preset an increased desired cross-section in the air bypass conduit for example, to compensate for the higher load due to the disturbance. If the disturbance correcting signal K from the block 20 was too large, then a negative difference signal x is produced. The momentary difference signal x is processed in a multiplicator 25 whose function will be explained below, and passes through a preparation stage in which the processed difference signal x is being weighed and prepared for the addition to the constant disturbance correcting signal K. In this specific embodiment the preparation stage consists of another integrator 26 which subjects the difference signal to a preset computation procedure; the preset computation or integration procedure is always performed for the time point $t_1$ at which the output from the integrator 26 remains constant. The output signal y from the integrator 26 is applied to a summer 27 where it is added to the constant disturbance correcting signal K. Accordingly, in the course of the forward switching-in or feeding of the disturbance variable an adaptive disturbance variable correction signal is produced which represents an optimum match to the action of the disturbance and provides a proper correction of the effects of the disturbance on the regulating path. The removal of load corresponds in equal sense to an application of a disturbance variable and consequently the above described self-adaption can be accomplished in the same way also during the disconnection of a load. Of course, the different signal x before it feeding into integrator 26, must be multiplied in the multiplication stage 25 by a factor $-1$. The multiplicator 25 is controlled by the disturbance variable A.

The computation formula performed by the integrator 26 can be for example as follows:

$$Y(i) = Y(i-1) + K/256 \cdot x(i)$$

It will be understood however that this example of an integrating formula can be modified in arbitrary manner depending on the actual conditions of the regulation and on the kind of the disturbance variable which is to be corrected. In the formula i denotes the actual time point of the feeding forward of a constant disturbance correcting signal whereas $(i-1)$ refers to a preceding feeding forward of the disturbance correcting signal. This design of the integrator 26 effects the adjustment of the disturbance correcting signal distributed over a plurality of switching processes. In this manner the risk of misadjustment which is not excluded when only a single switching process is made, is avoided and it is guaranteed that the forward feeding of the adapted correction signal is always related to the particular disturbance variable A. Due to the averaging of output signals resulting from a plurality of switching processes according to the before-mentioned integrating formula the danger of misadjustment is practically eliminated.

In addition, it is necessary that the self-adaption of the disturbance correcting signal takes place under the following conditions:
 a: The switch of the air throttling valve is closed and
 b: The speed of the motor vehicle driven by the engine is 0.

Inasmuch as according to the above-mentioned conditions the allowable adaption of the disturbance correcting signal requires an indication of the speed of the motor vehicle, the above conditions (a) and (b), in a modification of this invention can be with advantage substituted by the following set of conditions, after which adaption of the disturbance correcting signal is also possible:
 a': The switch of the air throttling valve is also closed;
 b': The rotary speed of the engine (or a filtered rotary speed value resulting for example from an anti-jerking circuit) remains for a predetermined time period $\Delta t_1$ in a certain idling speed range $\Delta n$;
 c': While the change $\Delta T$ of the keying ratio to the controlled position of the setting member (or the output of the regulator before the adaption of characteristic curves $\Delta Q_{soll}$ as shown in FIG. 1) remains for a certain time period $\Delta t_2$ below a preset limit value:

$$\frac{\Delta T}{\Delta t_2} < \frac{T_{grenz}}{t_2} \text{ or } \frac{\Delta Q_{soll}}{\Delta t_2} < \frac{\Delta Q_{grenz}}{\Delta t_2}.$$

The two latter conditions b' and c' must occur simultaneously (AND operation) and it should be guaranteed that in the idling speed range for a preset time interval no larger load and rotary fluctuation will occur. Under these circumstances the adaptive forward feeding of disturbance correcting value is still made possible even in the case when the speed v of the motor vehicle is not equal to 0. The term keying ratio T relates to a conventional arrangement of a so-called two coil rotary setting member used for example for the control of the cross-section of a bypass conduit for feeding an air quantity Q during idling speed. This term is indicative of the fact that by changing the keying ratio of a train of rectangular pulses controlling the two coil rotary setting member and acting for a longer or shorter time period on one of the two coils of the latter, the corresponding change of the clear cross-section in the bypass air conduit will result.

Furthermore a provision is made that at a speed of the motor vehicle which is not equal to 0 the integrating regulator 10a of the idling speed regulating system 10 is fixed. That means that up to the next stopping of the motor vehicle driven by the engine only the condition regulator 10b is active and the integral regulator 10a even during prolonged overrun or engine breaking operation (driving the engine while the vehicle is coasting downhill and the air throttling valve is closed or almost closed), is not allowed to run at low values. This lock for the integrating regulator 10a is released only after the speed drops below the desired rotary $n_{soll}$ or if v=0. Such a behavior corresponds to that after a fuel shock whereby the integrating regulator 10a is also fixed or locked.

It will be understood that in the case of the occurrence of several disturbance variables which may take effect on the behavior of the regulating path of the engine, there is a possibility to assign to the regulator 10 a plurality of adaptive forward feeding or switching systems for the disturbance variables which selectively react to a particular disturbance, take a lesson from the behavior of the regulator and finally adapt a disturbance correcting signal for substantially eliminating the effects of the particular disturbance.

It will be understood that each of the functional blocks described above, or two or more together, may also find a useful application in other types of constructions differing from the types described above.

While the invention has been illustrated and described as embodied in a specific of a self-adaptive disturbance correcting circuit in a regulator system, it is not intended to be limited to the details shown since various modifications and structural changes may be made without departing in way from the spirit of the present invention.

Without further analysis, the foregoing will so fully reveal the gist of the present invention that others can, by applying current knowledge, readily adapt it for various applications without omitting features, from the standpoint of prior art, fairly constitute essential characteristics of the generic or specific aspects of this invention.

What is claimed as new and desired to be protected by Letters Patent is set forth in the appended claims:

1. A method of forward feeding a disturbance variable in a regulator, particularly in an idling speed air charge regulator for an internal combustion engine, comprising the steps of
    storing in a memory an output signal from the regulator occurring at a feed-in time point $t_0$ of a disturbance;
    settling the disturbance by the regulator;
    comparing at a later time point $t_1$ when the disturbance has been settled, the actual output signal from the regulator with the stored output signal to produce a difference signal;
    deriving from the difference signal an adaptive correction signal; and
    combining the adaptive correction signal with a constant disturbance correcting signal K applied to the output of the regulator so as to minimize a deviation between a preset desired magnitude and an actual magnitude under regulation.

2. A method as defined in claim 1, wherein a final adaptive correction signal is generated by averaging a plurality of component adaptive correction signals resulting from a plurality of forward switching processes of the disturbance variable.

3. A method as defined in claim 1, wherein said regulator includes an integrating regulating circuit which during the feed-in time point $t_0$ delivers its output signal corresponding to an integration level at the feed-in time point for storing in said memory, and at said later time point $t_1$ delivers its output signal indicative of the actual integration level for comparison with the stored output signal, then the result of the comparison is subject to a predetermined computation process and thereafter is added to the constant disturbance correcting signal.

4. A method as defined in claim 1, wherein on interruption of the forward feeding of the disturbance variable the adaptive correction signal is converted into a negative signal.

5. A method as defined in claim 1, wherein the adaptive correction signal is derived under the conditions that a throttling valve switch of the engine is closed and the speed of a motor vehicle driven by the engine is 0.

6. A method as defined in claim 1, wherein the adaptive correction signal is derived under the conditions that a throttling valve switch of the engine is closed, the rotary speed in a certain idling range $\Delta n$ remains unchanged for a predetermined period of time $\Delta t_1$ while a change $\Delta T$ of a keying ratio to the position of a setting member or the change $\Delta Q_{soll}$ of the output of the regulator remains for a predetermined time period $\Delta t_2$ below a preset limit value.

7. A device for forward feeding a disturbance variable in a regulator, particularly in an idling speed air charge regulator of an internal combustion engine, comprising a source of a constant disturbance correcting signal, a storing device actuated at a time point $t_0$ of the occurrence of a disturbance variable and having an input connected to an output of said regulator to store an output signal thereof at the time point $t_0$, a summing device having an input connected to said source of the constant disturbance correcting signal and an output connected via switching means to a regulating output of said regulator, said switching means being actuated at the time point $t_0$ of the occurrence of the disturbance variable, comparing means connected to an output of said storing device and to said first mentioned output of the regulator, an output of said comparing means being connected via a preparation circuit to another input of said summing device, and said regulator having an input connected via a subtractor to a regulating feedback path from the engine and to a source of desired value to be regulated.

8. A device as defined in claim 7, further comprising means for blocking or releasing the forward feeding of the combined disturbance correcting signal, said means releasing the latter signal in response to the closing of a throttling valve switch while the speed of a motor vehicle driven by the engine is 0.

9. A device as defined in claim 7, comprising means for blocking or releasing the forward feeding of the disturbance correcting signal in the regulator, said means releasing the latter signal in response to the closure of a throttling valve switch while rotary speed is for a preset time period $\Delta t_1$ in a range of the idling speed and a change $\Delta T$ of keying ratio to a setting member position or a change $\Delta Q_{soll}$ of the regulating output signal from the regulator remains for a certain time period $\Delta t_2$ below a preset limit value.

10. A device as defined in claim 7, wherein said regulator includes an integrating regulating unit whose output corresponds to said first mentioned output from the regulator which delivers at the time point $t_0$ a first output signal indicative of a first integration level into said storing device and at a later time point $t_1$ a second output signal indicative of the final integration level for comparison in said comparing means, said preparation means including an integrator operating according to a preset formula for processing an output signal from said comparing means and for applying the processed output signal to the second input of said summing device.

11. A device as defined in claim 10, further comprising an integrating unit connected to the output of said integrated regulating unit to receive a plurality of output signals pertaining to a plurality of forward feedings of said disturbance, said comparing means producing a corresponding plurality of different signals applied to said integrator where the differences are averaged according to a preset formula and the average signal is applied at the second time point $t_1$ to said second input of said summing device.

12. A device as defined in claim 11, further comprising a multiplicator connected between the output of said comparing means and said integrator, said multiplicator being controlled by said disturbance variable to negate the ouput signal from said comparing means when the disturbance variable is disconnected.

* * * * *